(12) United States Patent
Mehrotra

(10) Patent No.: US 7,937,622 B2
(45) Date of Patent: May 3, 2011

(54) METHOD AND SYSTEM FOR AUTONOMIC TARGET TESTING

(75) Inventor: Mudit Mehrotra, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/618,358

(22) Filed: Dec. 29, 2006

(65) Prior Publication Data

US 2008/0163003 A1 Jul. 3, 2008

(51) Int. Cl.
*G06F 11/00* (2006.01)
(52) U.S. Cl. .............................. 714/25; 714/38; 717/124
(58) Field of Classification Search .................. None
See application file for complete search history.

(56) References Cited

U.S. PATENT DOCUMENTS

| | | | |
|---|---|---|---|
| 6,085,029 A | 7/2000 | Kolawa et al. | |
| 6,418,543 B1 * | 7/2002 | Goli et al. | 714/38 |
| 7,178,063 B1 * | 2/2007 | Smith | 714/38 |
| 7,316,004 B2 * | 1/2008 | Sluiman et al. | 717/125 |
| 7,581,138 B2 * | 8/2009 | Bartucca et al. | 714/25 |
| 2004/0194063 A1 | 9/2004 | Pereira | |
| 2005/0066234 A1 * | 3/2005 | Darringer et al. | 714/38 |
| 2005/0153269 A1 | 7/2005 | Driscoll et al. | |
| 2008/0126880 A1 * | 5/2008 | Hegarty et al. | 714/46 |
| 2008/0215921 A1 * | 9/2008 | Branca et al. | 714/38 |

FOREIGN PATENT DOCUMENTS

WO WO 2005/045673 A2 5/2005
* cited by examiner

*Primary Examiner* — Christopher S McCarthy
(74) *Attorney, Agent, or Firm* — Hamilton, Brook, Smith & Reynolds, P.C.

(57) ABSTRACT

A target is autonomically tested using a number of test cases. Dependencies among the test cases exist. A dependency between a first test case and a second test case means that where testing of the target using the first test case results in failure, testing of the target using the second test case is not performed. The dependencies among the test cases are constructed using one or more dependency rules. The dependency rules are updated while testing of the target using the test cases is performed, such that new dependencies among the test eases revealed during testing are incorporated into the dependency rules. Autonomic testing in this way provides for more intelligent testing of the target without human interaction and/or human intervention.

17 Claims, 6 Drawing Sheets

METHOD AND SYSTEM FOR AUTONOMIC TARGET TESTING

FIELD OF THE INVENTION

This invention relates generally to autonomic testing of a target such as hardware, software, or a combination of hardware and software, using test cases, and more particularly to such testing in which upon a particular test case failing other test cases that are dependent on the particular test case are not tested for.

BACKGROUND OF THE INVENTION

Computing systems, including hardware, software, and combinations of hardware and software, are becoming larger and more complex, in part due to the increasing demands placed on such systems as well as modern development tools permitting their creation. At the same time, competitive and other demands are resulting in shortened development cycles of such computing systems. As a result, testing of the systems before they are employed by end users has become increasingly important.

To achieve thorough yet timely testing of computing systems, automated testing has become more common. Automated testing can involve testing a computing system using a large number of different test cases. Each test case may include a unique set of parameters by which the computing system is to be tested, and/or a sequence of one or more actions to be performed in relation to the computing system. Once a thorough set of test cases has been developed, automated testing of the computing system in question can be performed largely without any human interaction.

However, a disadvantage with automated testing, as opposed to human testing, of a computing system can take long periods of time. A further disadvantage is that automated testing is typically performed in an unintelligent and routine manner based on a predefined set of rules. For example, testing of a given application may include a test case of selecting a print menu item and verifying that a print dialog window is responsively displayed. Another test case may include selecting a print options button on the print dialog window and verifying that a print options window is responsively displayed.

However, even if the former test case fails, existing automated testing tools will attempt to test the latter test case—even though it is readily apparent to human testers that if the print dialog window is not displayed, then there is no way for the print options button to be selected. It can be said, for instance, that the latter test case is dependent on the former test case, in that failure of the former test case necessarily results in failure of the latter test case. Nevertheless, existing automated testing tools do not take into account such dependencies among test cases.

Therefore, there is a need for an improved system and method for autonomic testing of a target using test cases which alleviates one or more of the above problems.

SUMMARY OF THE INVENTION

This invention relates generally to autonomic testing of a target using test cases. In one embodiment, a method of this invention adds test cases into a queue. A next test case (i.e., which is initially the first test case) within the queue is then set as the current test case. The target is tested using the current test case. If testing the target using the current test case results in failure, such that an error-causing condition of the failure has been yielded, the following is performed. Where the current test case has never failed before, or where the current test case has failed before but is not associated with the error-causing condition, a database is updated to associate the current test case with the error-causing condition. Any other test cases that are associated with this error-causing condition are removed from the queue. This process is repeated until the queue is empty.

In a further embodiment, a method of this invention constructs dependencies among the test cases using one or more dependency rules. A dependency between a first test case and a second test case means that where testing of the target using the first test case results in failure, testing of the target using the second test case is not performed. The target is tested using the test cases, such that whether the target is tested using a particular test case is governed by the dependencies among the test cases and success or failure of previous testing of the target using other test cases. The dependency rules governing construction of the dependencies among the test cases are updated as the target is tested.

In a further embodiment, a system of includes an automated testing sub-system and an autonomic test-managing sub-system. The automated testing sub-system tests the target using the test cases organized within a queue, on a test case-by-test case basis. The automated testing system outputs a log as the target is tested using the test cases. The log indicates whether the test cases have failed or succeeded, and where the test cases have failed, the log also indicates error-causing conditions resulting in the failure. The autonomic test-managing sub-system in this embodiment reviews the log after the target has been tested using a current test case. The autonomic test-managing sub-system associates the current test case with an error-causing condition where the current test case has failed and the current test case is not associated with the error-causing condition already. The autonomic test-managing sub-system removes any other test cases from the queue that are associated with the error-causing condition.

In a further embodiment, a system also includes the autonomic test-managing sub-system and the automated testing sub-system. The autonomic test-managing sub-system constructs dependencies among the test cases using one or more dependency rules. A dependency between a first test case and a second test case means testing of the target using the first test case results in failure, and testing of the target using the second test case is not performed. The automated testing sub-system tests the target using the test cases, such that whether the target is tested using a particular test case is governed by the dependencies among the test cases, and success or failure of previous testing of the target using the other test cases.

Embodiments of this invention provide advantages over the prior art. In particular, automated testing is performed intelligently removing redundancy, and therefore more efficiently. Further advantages, aspects, and embodiments of this invention will become apparent by reading the description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention and the following detailed description is, therefore, not to be taken in a limiting sense.

Figure 1:
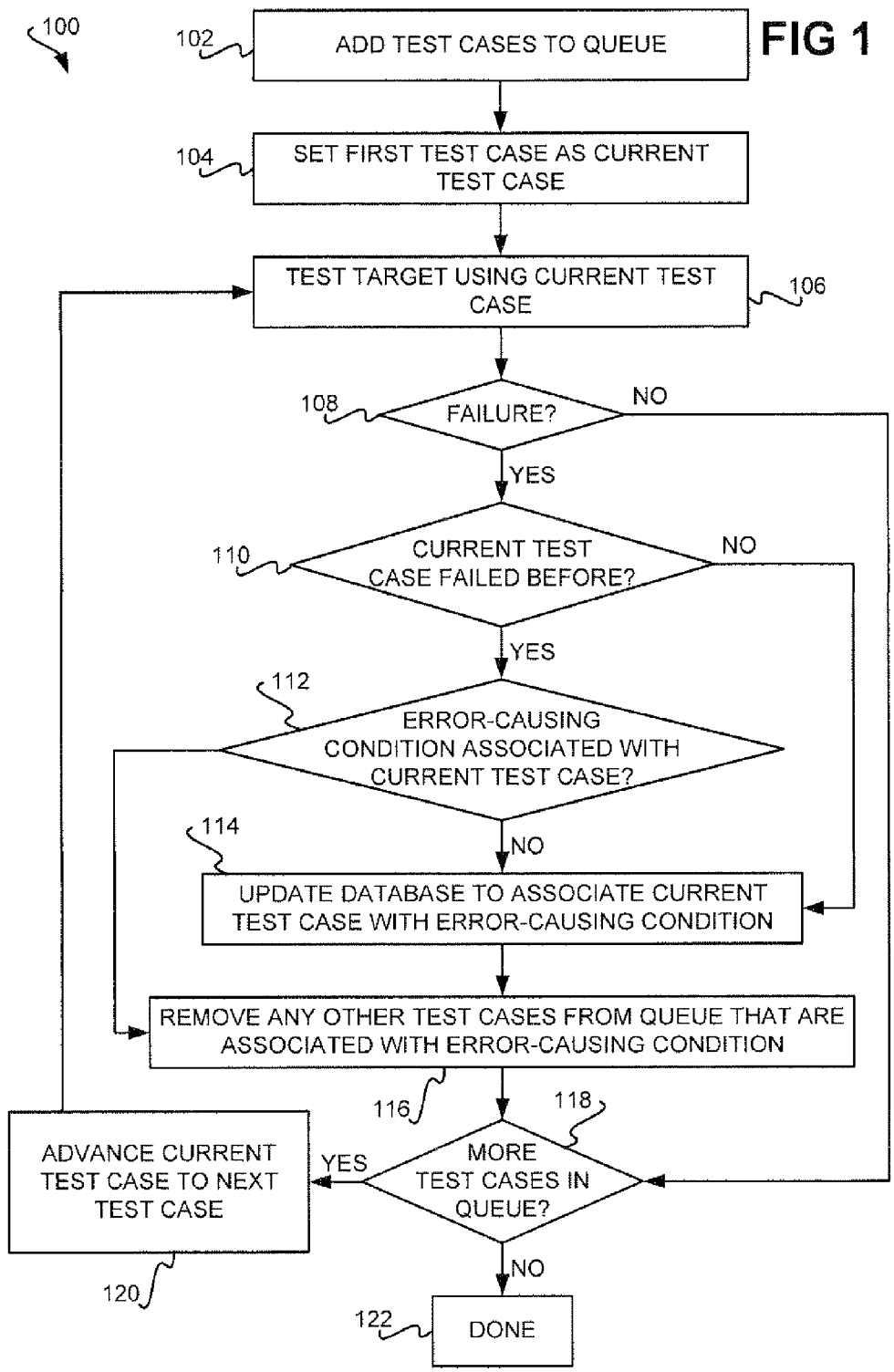
FIG. 1 is a flowchart of a method for autonomically testing a target, according to a specific embodiment of the invention.

Autonomic testing of a target in accordance with the invention aids in understanding how an embodiment of the invention works. FIG. 1 shows a method 100 for autonomically testing a target using test cases. The target may be a software system, a hardware system, or a system containing both software and hardware. The test cases each include a set of parameters by which the target is to be tested and/or a sequence of one or more actions to be performed in relation to the target for testing the target. The test cases may be manually constructed a priori, or may be developed in an automated manner, as can be appreciated by those of ordinary skill within the art.

In 102, all of the available test cases are added to a queue. Next, in 104, the first test case within the queue is set, or specified, as a current test case. Next, in 106, the target is then tested using the current test case. For example, the target is set to the parameters specified by the current test case, and/or the actions specified by the current test case are performed in relation to the target. The target may be directly tested, or it may be indirectly tested by using an automated testing system modeling the target. In either case, the current test case is said to be input in relation to the target in order for the target to be tested using the current test case.

The results of testing the target using the current test case are logged in the system. The test log (hereinafter referred to as simply the log) may indicate that the testing has been successful, or has failed (that latter including partial success). Where testing the target using the current test case has failed, the log may further indicate an error-causing condition yielded by the testing. The error-causing condition is particularly the condition that caused the target to fail when being tested using the current test case. In 108, if testing of the target using the current test case is successful, control is transferred to 118, where there are more test cases in the queue, then the method 100 advances the current test case to the next test case within the queue in 120, and the method 100 is repeated at 106. If there are no more test cases within the queue in 118, the execution of the method 100, in 122 the execution of the method is completed.

However, if testing of the target using the current test case results in failure in 108 instead, then the method 100 performs as follows. In 110, if the current test case has never failed before, then a database is updated to associate the current test case with the error-causing condition in 114. The database may include a number of records, where each record corresponds to an error-causing condition, and the test cases that fail when this error-causing condition occurs. Thus, updating the database results in either an existing record corresponding to the error-causing condition in question to be updated to include the current test case, or a new record is created that corresponds to the error-causing condition and that includes the current test case.

In one embodiment, the records are specified, or structured, in a markup language, such as the eXtended Markup Language (XML). An example of such a database of records is as follows:

```
<Dependencies>
    <Record>
        <ErrorCausingCondition>
        </ErrorCausingCondition>
        <TestCases>
            <TC1></TC1>
            <TC2></TC2>
            ...
            <TCn></TCn>
        </TestCases>
    </Record>
    ...
</Dependencies>
```

In this example, the database is specified via the tag Dependencies. The database includes a number of records. Each record includes an error-causing condition specified via the tag ErrorCausingCondition. Each record further includes one or more test cases, specified via the tag TestCases, and enumerating these test cases, via the tags TC1, TC2, . . . , TCn.

Thereafter, any further test cases that are associated with the error-causing condition that resulted in the failure of the current test case are removed from the queue in 116. As such, the target will not be tested using these not-yet-performed test cases, due to their removal from the queue. In general, test cases that are dependent on a given test case are removed from the queue when the source of the dependency, the error-causing condition, results during testing of the target using the given test case. At this point, the method 100 then proceeds to 118, as discussed previously.

If, however, in 108 the testing of the target using the current test case results in failure control is transferred to 110 where a test is made if the current test case has failed before, and the method 100 then proceeds to 112. Thus, if the error-causing condition that resulted in the failure of the current test case is already associated with the current test case in the database in 112, then the method 100 proceeds to 116, where other test cases associated with this error-causing condition are removed from the queue, as has been described previously. Otherwise, the method 100 proceeds to 114, so that current test case is associated with the error-causing condition in the database, previous to removal of other test cases associated with this error-causing condition from the queue in 116.

Figure 2:
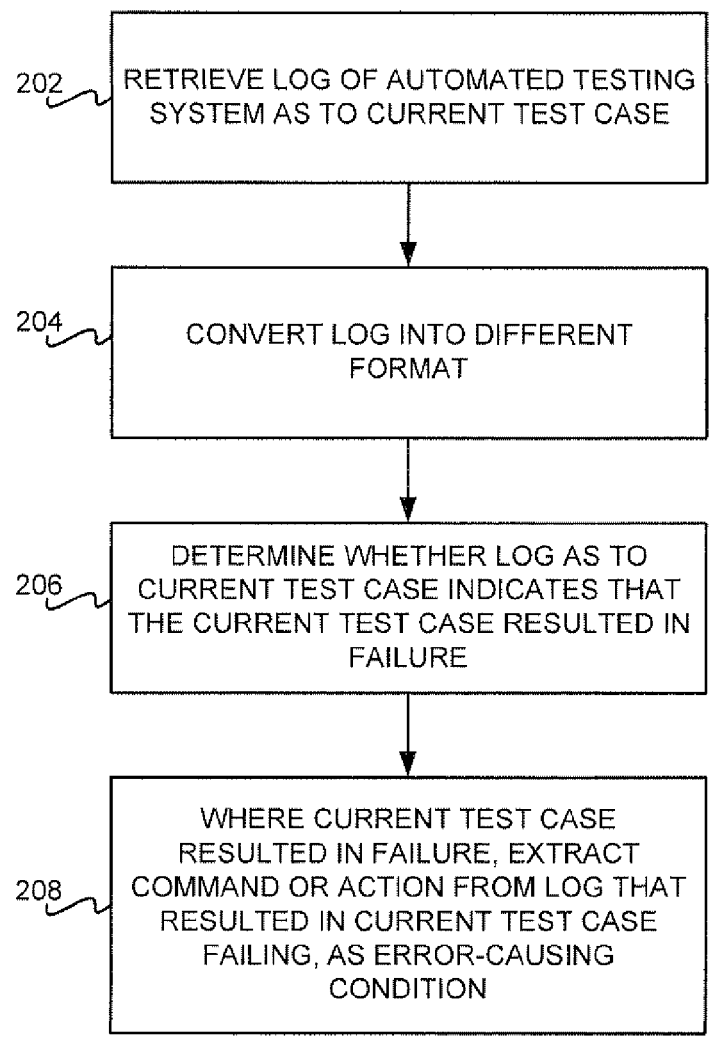
FIG. 2 is a flowchart of a method for determining whether testing a target using a current test case has resulted in failure or success, according to an embodiment of the invention.

FIG. 2 shows a method 200 for determining whether testing of the target using a current test case has resulted in failure or success, according to an embodiment of the invention. For instance, the method 200 may be performed as a part of the method 100, between 106 and 108. First, in 202 a log of an automated testing system in relation to which the target has been tested as to the current test case is retrieved. A separate log may be generated for each test case, in which case the entire log is retrieved. Alternatively, a log may be updated or appended as the test cases are processed, in which case a portion of the log corresponding to the current test case in question is retrieved.

In 204, the log may be converted into a different, or common, format that is understandable by the component or sub-system performing the method 200. For example, the log generated by the automated testing system may be within a proprietary, or otherwise a non-standardized, format. Therefore, the log may be converted so that it is within a common, standard format.

Thereafter, in 206 the log is examined to determine whether the log, as to the current test case, indicates that the current test case resulted in failure or success. If the log indicates that the current test case resulted in failure, a command or action (i.e., an event) is extracted from the log in 208, where this command or action (i.e., an event) resulted in failure of testing of the target using the current test case. This command or action is considered the error-causing condition of the current test case. For example, execution of a certain command, or performance of a certain action, may have resulted in failure, such that this certain command or action is the error-causing condition.

Figure 3:
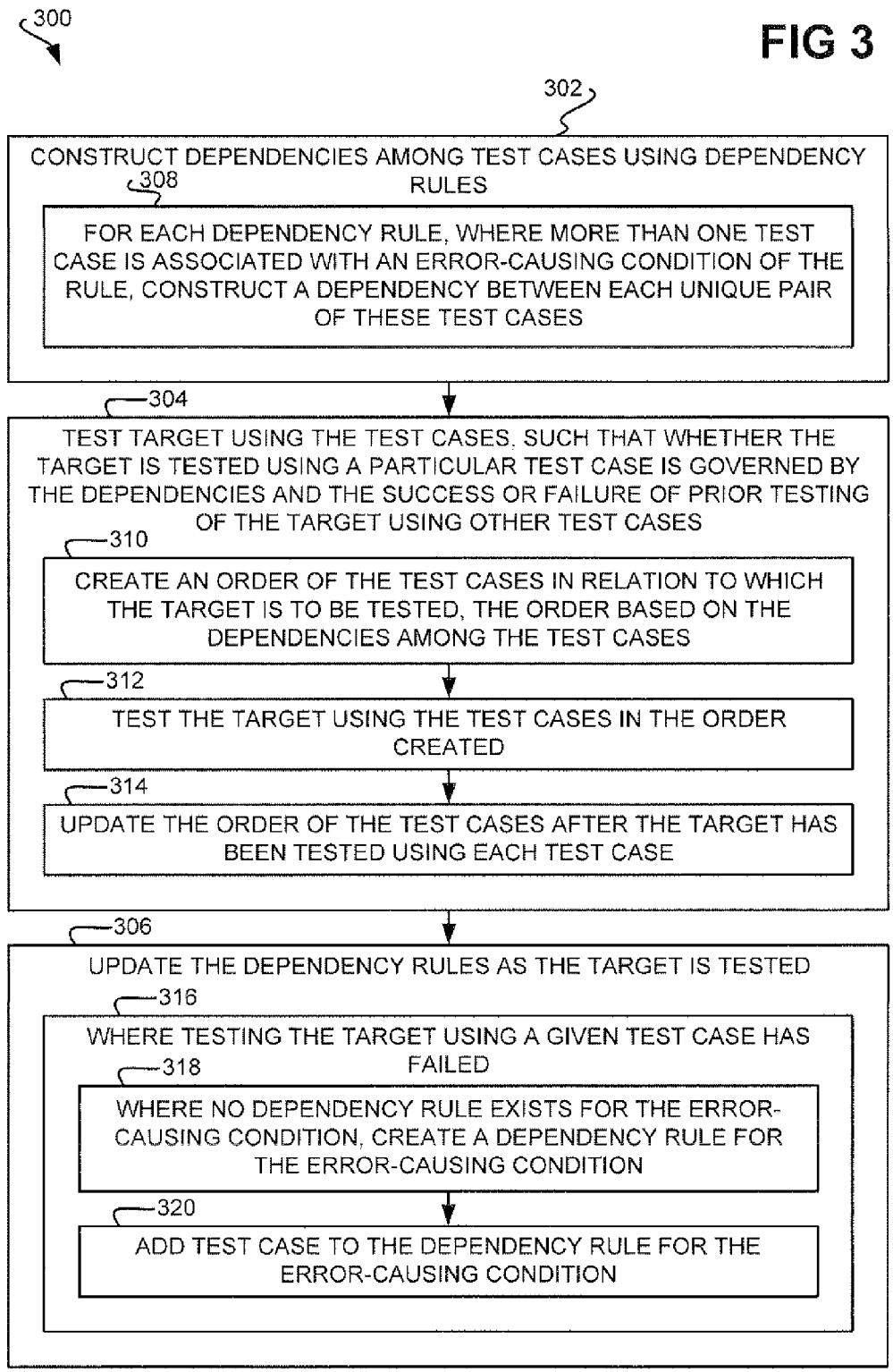
FIG. 3 is a flowchart of a method for autonomically testing a target according to a more general embodiment of the invention that encompasses the specific embodiment depicted in FIG. 1.

FIG. 3 shows a method 300 for autonomically testing a target using test cases, according to an embodiment of the invention that is more general than but that encompasses the embodiment of FIG. 1. The method 300 is first described in relation to its most general parts 302, 304, and 306. Thereafter, one implementation of these parts is described. It is noted that the ordering of the parts of the method 300 do not necessarily imply that they are performed in this order. In actuality, the parts 302, 304, and 306, for instance, are performed iteratively and/or concurrently, before, during, and after the testing of part 304, as will become apparent.

Dependencies are constructed among the test cases using dependency rules (302). A dependency between a first test case and a second test case implies or indicates that if the first test case results in failure, then the second test case necessarily results in failure, and vice-versa. Therefore, if the target is tested using either the first or the second test case, and such testing results in failure, then the target does not have to be tested using the other test case in question, since it is known a priori that failure will result.

The target is thus tested using the test cases (304), where whether the target is tested using a particular test case is governed by the dependencies that have been constructed, based on the success or failure of prior testing of the target using the other test cases. It is noted that as the target is tested, the dependencies are continually reconstructed, or updated, in part 302. New dependencies may be revealed, for instance, as the target is tested. The target is not tested using a given test case if the target has already failed testing using another test case on which the given test case is dependent.

The dependency rules that govern the construction of the dependencies among the test cases are updated as the target is tested (306). A dependency may result from a common error-causing condition. For example, if three test cases all fail when a given error-causing condition occurs, then these three test cases are dependent on one another. A dependency rule may specify the error-causing condition in question, as well as list the three test cases that fail when this condition is encountered. As such, the dependency rules can correspond to the records of the database that have been described in the previous section of the detailed description.

Referring back to part 302, in one embodiment the dependencies are constructed among the test cases using the dependency rules as follows. Specifically, for each dependency rule, if there is more than one test case associated with the error-causing condition of the rule, then a dependency is created between each unique pair of these test cases (308). Using the example of the previous paragraph, a dependency rule may specify a given error-causing condition, and three test cases that are associated with this condition. If these three test cases are specified as TC1, TC2, and TC2, then there are the following dependencies TC1←→TC2, TC1←→TC3, and TC2←→TC3. Thus, TC1 is dependent on TC2 (and vice-versa), TC1 is dependent on TC3 (and vice-versa), and TC2 is dependent on TC3 (and vice-versa).

Referring to part 304, in a further embodiment, the target is tested using the test cases as follows. An order of the test cases is created, in relation to which the target is to be tested, where the order is based on the dependencies among the test cases (310). For example, if there are three test cases, a priori the order may be to test TC1, then test TC2, and then test TC3. The target is then tested using the test cases in the order that has been created (312). However, after each test case has been tested, the order is updated (314). For example, the initial order of the three test cases may be TC1, TC2, and TC3. A dependency may exist between TC1 and TC2. Therefore, if TC1 has failed, the order is updated to be TC1 followed by TC3, where TC2 is skipped since it is dependent on TC1. In this way, the order of the test cases is created and updated based on the dependencies among the test cases.

Referring to part 306, in a further embodiment, updating the dependency rules as the target is tested is performed as follows. Where testing the target using a given test ease has resulted in failure (316), then the following is performed. First, if no dependency rule exists for the error-causing condition that resulted in the failure of the test case, then a dependency rule for the error-causing condition is created (318). Thereafter, the test case is added to the newly created or already existing dependency rule for the error-causing condition (320). If the dependency rule is newly created, then the test case in question will be the first test case for the rule. If the dependency rule already exists, then the test case will be one of multiple test cases for the rule. Once the dependency rules have been updated, the dependencies among the test cases may be updated in part 302, and the order of the test cases may be updated in part 314.

As an example, a test case TC1 may fail due to error-causing condition ECC1. There may already be a dependency rule for ECC1 in which the test case TC2 is specified. Therefore, TC1 is added to this dependency rule for ECC1. As a result, a new dependency is established, between TC1 and TC2. If TC2 has not yet been tested, then the order of the test cases is updated to skip TC2.

Figure 4:
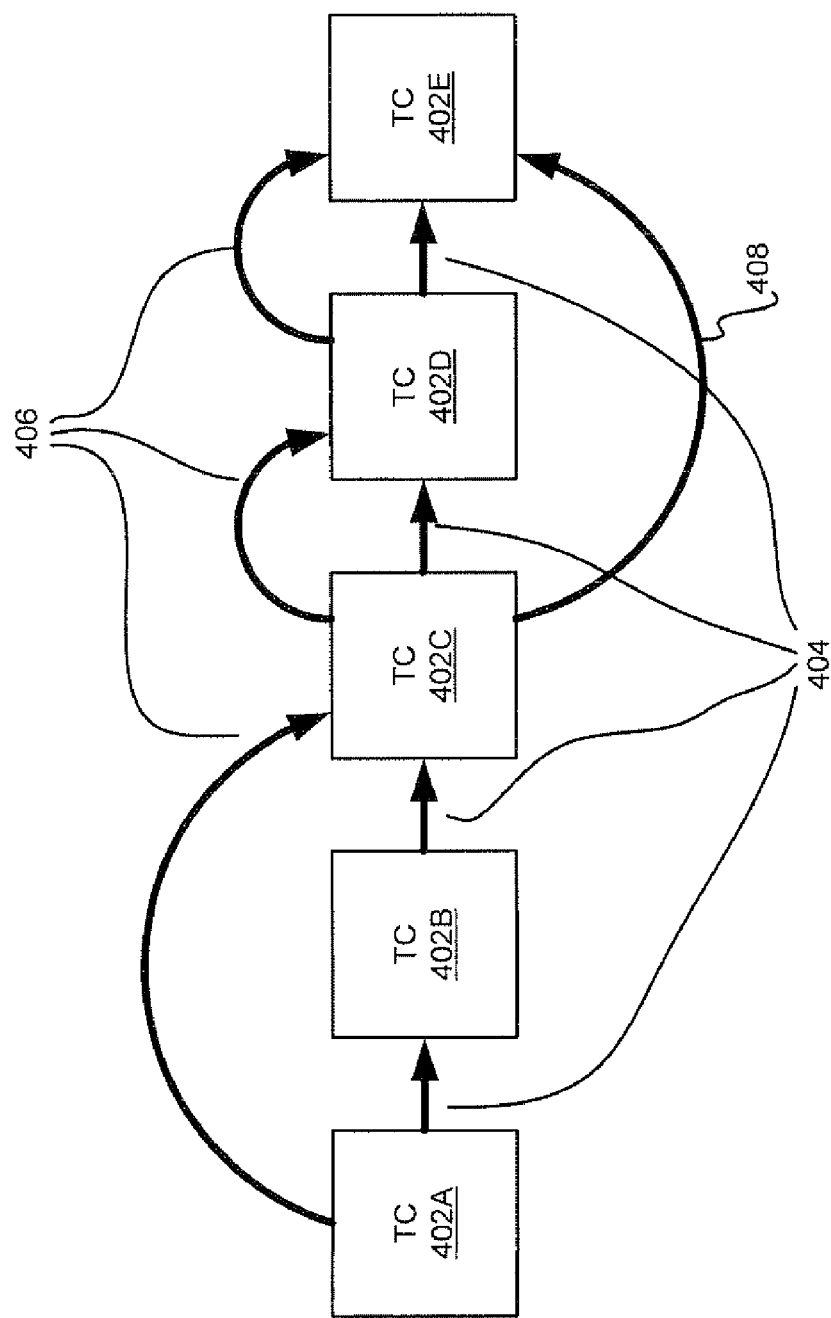
FIG. 4 is a diagram depicting illustrative and representative performance of the method of FIG. 3, according to an embodiment of the invention.

FIG. 4 shows a more comprehensive example performance of the method 300 of FIG. 3, according to an embodiment of the invention. There are five test cases 402A, 402B, 402C, 402D, and 402E, collectively referred to as the test cases 402. It is presumed that there are no dependencies among the test cases 402 at first. The test cases 402 are initially ordered for testing as indicated by the arrow segments 404. Thus, initially, the test case 402A is to be tested, then the test case 402B, followed by the test case 402C, and so on.

Once the target has been tested using the test case 402A, a dependency may result between the test cases 402A and 402B. For example, the test case 402A may have failed due to an error-causing condition ECC1, where ECC1 is previously known to cause the test case 402B to fail. Therefore, the test cases 402 are reordered as indicated by the arrow segments 406. As such, the test case 402B is skipped, and the test cases 402 are ordered so that the test case 402C is performed after the test case 402A, and thereafter the test cases 402D and 402E are tested.

Therefore, the target is tested using the test case 402C, which may result in a dependency between the test cases 402C and 402D. For example, the test case 402C may have failed due to an error-causing condition ECC2, where ECC2 is previously known to cause the test case 4502D to fail. Therefore, the test cases 402 are again reordered, as indicated by the arrow segment 408. As such, the test case 402D is skipped, and the test cases 402 are ordered so that the test case 402E is performed after the test case 402C.

Figure 5:
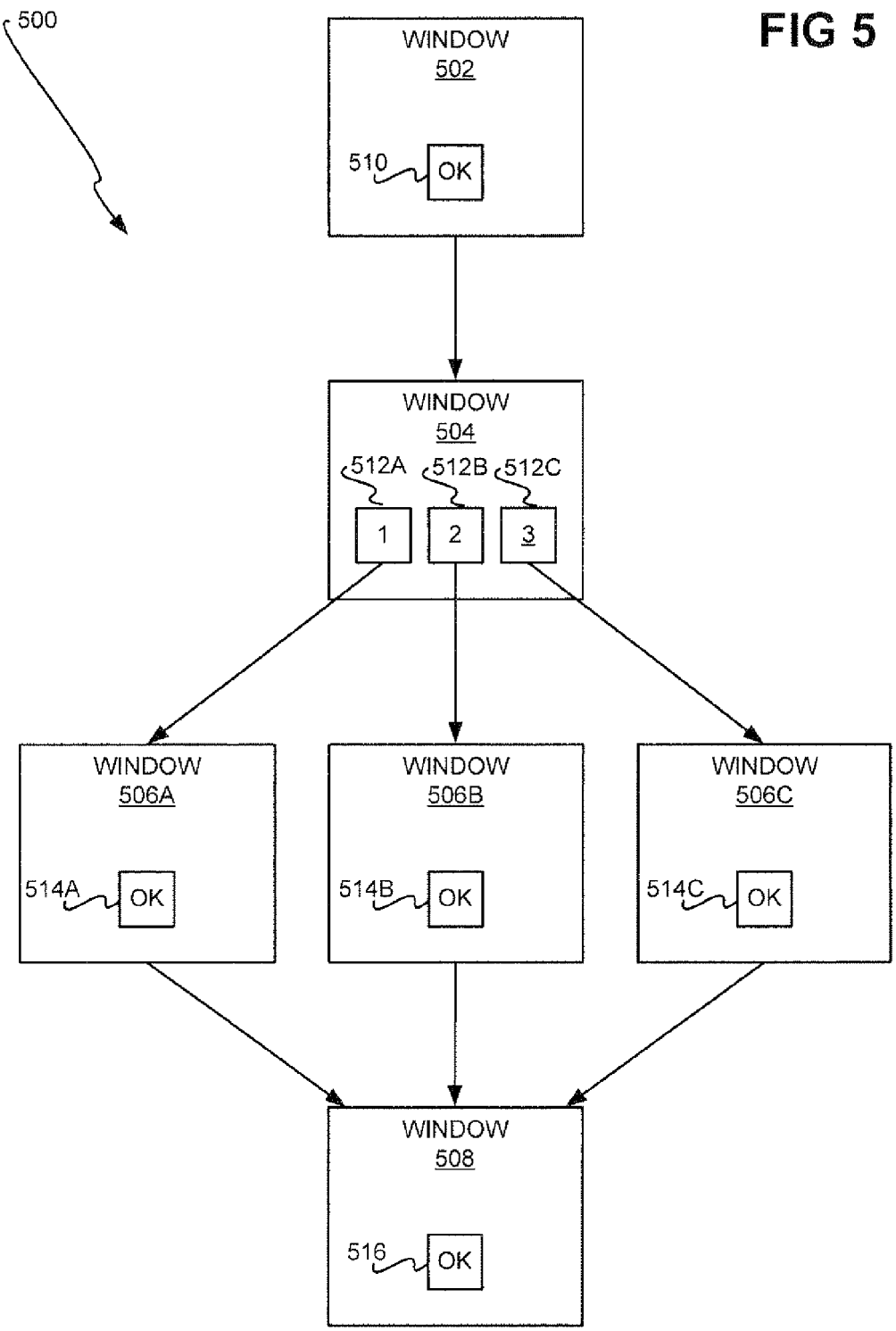
FIG. 5 is a diagram depicting an illustrative and representative scenario of a target that can be autonomically tested using the method of FIG. 1 or FIG. 3, according to an embodiment of the invention.

FIG. 5 shows an example target scenario 500, in relation to which embodiments of the invention can be performed. The scenario 500 may be a representative application computer program, for instance. The window 502 is initially displayed. When the OK button 510 of the window 502 is selected, the window 504, having the buttons 512A, 512B, and 512C, is displayed. When the button 512A is selected, the window 506A is displayed; when the button 512B is selected, the window 506B is display; and, when the window 512C is selected, the window 506C is displayed. Selecting the button 514A, the button 514B, or the button 514C finally causes the window 508 to be displayed. Selecting the button 516 of the window 508 causes the scenario 500 to end.

Three test cases for the scenario 500 are as follows. The first test case TC1 is to press button 510 on the window 502, press button 512A on the window 504, press button 514A on the window 506A, and then press button 516 on the window 508. The second test case TC2 is to press button 510 on the window 502, press button 512B on the window 504, press button 514B on the window 506B, and then press button 516 on the window 508. The third test case TC3 is to press button 510 on the window 502, press button 512C on the window 504, press button 514C on the window 506C, and then press button 516 on the window 508.

There further may be five error-causing conditions. The first such condition ECC1 may be that the window 502 is not displayed. ECC1 causes all three TC1, TC2, and TC3 to fail. The second condition ECC2 may be that that the window 504 is not displayed, which also causes all three TC1, TC2, and TC3 to fail. The third condition ECC3 may be that the window 506A is not displayed, which causes just TC1 to fail. The fourth condition ECC4 may be that the window 506B is not displayed, which causes just TC2 to fail. The fifth condition ECC5 may be that the window 506C is not displayed, which causes just TC3 to fail.

The initial ordering of the test cases may be for TC1 to be tested, then TC2, and finally TC3. If TC1 fails as a result of ECC1 or ECC2, then TC2 and TC3 are removed from the queue, and are not tested, since ECC1 and ECC2 are error-causing conditions common to all the test cases. However, if TC1 fails as a result of ECC3, then TC2 and TC3 are still tested, because ECC3 is an error-causing condition that is specific to just TC1, and not to TC2 and TC3.

At the start, however, none of the error-causing conditions ECC1, ECC2, and ECC3 may be known insofar as the test cases are concerned. Therefore, if TC1 fails as a result of ECC1, for example, a dependency rule is created linking ECC1 with TC1. TC2 is still tested, and also may fail as a result of ECC1, such that TC2 is added to this dependency rule. Likewise, TC3 is still tested, and if it fails as a result of ECC1, TC3 is also added to this dependency rule. The next time the test cases are tested, however, if TC1 fails as a result of ECC1, then TC2 and TC3 are removed from the queue, and are not tested, since a dependency of TC1, TC2, and TC3 is constructed based on ECC1.

Figure 6:
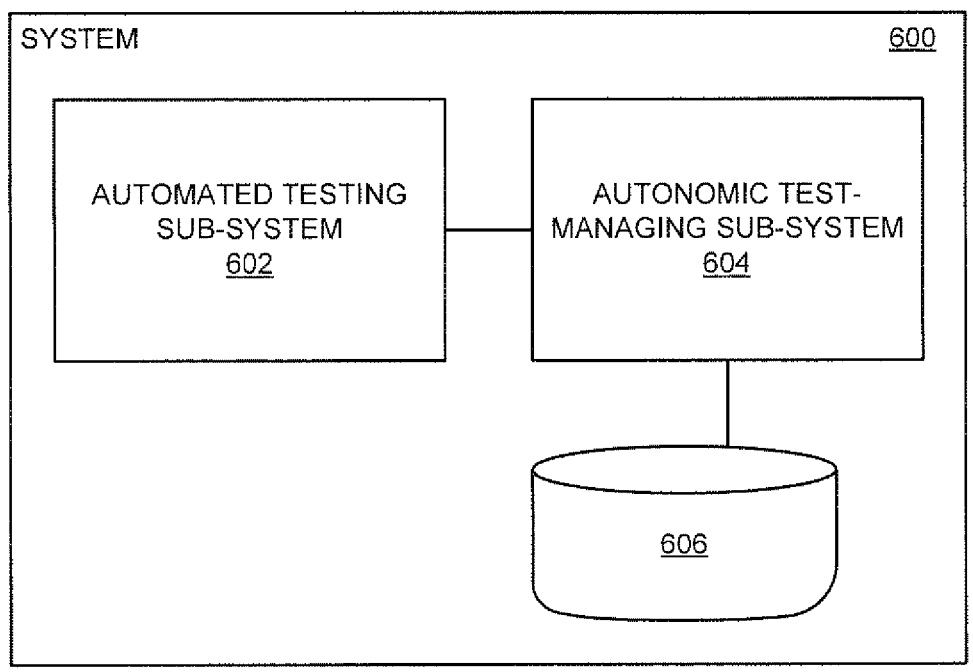
FIG. 6 is a diagram of a rudimentary system, according to an embodiment of the invention.

FIG. 6 shows a rudimentary system 600, according to an embodiment of the invention. The system 600 includes an automated testing sub-system 602, an autonomic test-managing sub-system 604, and a database 606. Each of the sub-systems 602 and 604 may be implemented in software, hardware, or a combination of software and hardware. The system 600 may include other components and/or sub-systems, in addition to and/or in lieu of those depicted in FIG. 6, as can be appreciated by those of ordinary skill within the art. The sub-system 604 particularly interacts with the sub-system 602 and the database 606, as indicated in FIG. 6.

The automated testing sub-system 602 tests a target using a number of test cases within a queue, on a test case-by-test case basis, and can output a log as the target is tested, as has been described previously. (The sub-system 602 may further be considered the means for testing the target using these test cases.) For instance, in relation to the method 100 of FIG. 1, the sub-system 602 may perform part 106. Likewise, in relation to the method 300 of FIG. 3, the sub-system 602 may perform part 304 and/or part 312.

The autonomic test-managing sub-system 604 in one embodiment reviews the log after the target has been tested using a given test case, associates the given test case with an error-causing condition where the case has failed and is not associated with the condition yet, and removes any other test cases from the queue that are associated with the condition in question, as has been described. For instance, in relation to the method 100 of FIG. 1, the sub-system 604 may perform parts 102, 104, 108, 110, 112, 114, 116, 118, 120, and/or 122.

The autonomic test-managing sub-system 604 in one embodiment constructs dependencies among the test cases using one or more dependency rules, and updates the dependency rules as the target is tested using the test cases, as has been described. (The sub-system 604 may be considered the means for constructing these dependencies.) For instance, in relation to the method 300 of FIG. 3, the sub-system 604 may perform parts 302, 306, 308, 310, 314, 316, 318, and/or 320. The database 606 can in one embodiment store records corresponding to the dependency rules that have been described previously. Furthermore, the database 606 may store the dependencies among the test cases.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

I claim:

1. A method for testing a target using a plurality of test cases comprising:
adding the plurality of test cases into a queue of an automated testing tool; and
repeating through the testing tool:
setting a next test case in the queue as a current test case; and
testing the target using the current test case,
where testing the target using the current test case results in failure and yields an error-causing condition of the failure, (i) where the current test case has never failed before, updating a database of the testing tool to associate the current test case with the error-causing condition;

(ii) where the current test case has failed before but the current test case is not associated with the error-causing condition within the database, updating the database to associate the current test case with the error-causing condition; and (iii) removing any other of the test cases from the queue that are associated with the error-causing condition within the database, wherein repeating said setting and testing is repeated until the queue is empty, and wherein testing of the target is autonomic and takes into account dependencies of the test cases to each other, source of the dependencies being error-causing conditions yielded during testing, including a dependency between a first test case and a second test case in the queue being where testing of the target using the first test case results in failure and a respective error-causing condition of that failure, then testing of the target using the second test case is not performed, the second test case being associated with respective error-causing condition of that failure and being removed from the queue, the second test case being removed from the queue irrespective of any bug fix being addressed.

2. The method of claim 1, wherein testing the target using the current test case comprises:
inputting the current test case to an automated testing system modeling the target; and,
determining whether testing the target using current test case resulted in failure to yield an error-causing condition.

3. The method of claim 2, wherein determining whether testing the target using the current test cases resulted in a failure for yielding the error-causing condition comprises:
retrieving a log of the automated testing system as to the current test case;
converting the log into a common format;
determining whether the log as to the current test case indicates that the current test case resulted in failure;
extracting a command or an action from the log that resulted in the current test case failing.

4. The method of claim 1, wherein each test case comprises one or more of:
a set of parameters by which the target is to be tested; and,
a sequence of one or more actions to be performed in relation to the target for testing the target.

5. A method for testing a target using a plurality of test cases comprising:
constructing dependencies among the test cases using one or more dependency rules in an automated testing tool, wherein source of dependencies are error-causing conditions of the failures yielded during testing, and a dependency between a first test case and a second test case means that where testing of the target using the first test case results in failure and a respective error-causing condition of the failure, then testing of the target using the second test case is not performed, the second test case being associated with the respective error-causing condition of the failure and being removed from a test queue irrespective of any bug fix being addressed;
testing the target using the test cases based on the dependency rules; and,
updating the dependency rules governing construction of the dependencies among the test cases as the target is tested using the test cases such that testing takes into account dependencies of the test cases to each other based on error-causing conditions of test failures and said testing is autonomic.

6. The method of claim 5, wherein whether the target is tested using a particular test case is governed by the dependencies among the test cases and success or failure of prior testing of the target using other of the test cases.

7. The method of claim 5, wherein testing the target using the test cases comprises:
creating an order of the test cases in relation to which the target is to be tested, the order based on the dependencies among the test cases;
testing the target using the test cases in the order created; and,
updating the order of the test cases after the target has been tested using each test case and after the dependency rules have been updated.

8. The method of claim 5, wherein updating the dependency rules governing construction of the dependencies among the test cases comprises:
where testing the target using a given test case has resulted in failure and has yielded an error-causing condition,
determining a dependency rule exists for the error-causing condition;
where the dependency rule does not exist,
creating the dependency rule for the error-causing condition;
adding the test case to the dependency rule for the error-causing condition.

9. A computer-based test system for computing systems comprising:
a computer automated testing sub-system formed of a computer processor configured to test a target using a plurality of test cases arranged within a queue, on a test case-by-test case basis, the automated testing sub-system configured to output a log as the target is tested using the test cases, the log indicating whether the test cases have failed or succeeded, and where the test cases have failed, the log further indicating error-causing conditions resulting in failure thereof; and,
an autonomic test-managing sub-system coupled to the automated testing sub-system, the autonomic test-managing sub-system being a computer processor configured to (i) review the log after the target has been tested using a current test case, (ii) associate the current test case with an error-causing condition where the current test case has failed and where the current test case is not associated with the error-causing condition, and further configured to (iii) remove any other of the test cases from the queue that are associated with the error-causing condition, such that testing of the target takes into account dependencies of the test cases to each other and testing is autonomic;
wherein source of dependencies are error-causing conditions of failures yielded during testing, and a dependency between a first test case and a second test case means that where testing of the target using the first test case results in failure and a respective error-causing condition of that failure, testing of the target using the second test case is not performed, the second test case being associated with the respective error-causing condition and being removed from the queue irrespective of any being bug fix being addressed; and
wherein the computer automated testing subsystem and the autonomic test-managing subsystem form a computer-based automated testing tool.

10. The test system of claim 9, wherein each test case comprises one or more of:
   a set of parameters by which the target is to be tested; and,
   a sequence of one or more actions to be performed in relation to the target for testing the target.

11. A computer-based testing system comprising:
   first computer processor means of a computer automated testing tool for constructing dependencies among a plurality of test cases using one or more dependency rules, source of dependencies being error-causing conditions of failures yielded during testing, where a dependency between a first test case and a second test case means that where testing of a target using the first test case results in failure and a respective error-causing condition of that failure, then testing of the target using the second test case is not performed, the second test case being associated with the respective error-causing condition of the failure and being removed from a test queue irrespective of any bug fix being addressed; and
   second computer-processor means of the testing tool for autonomic testing of the target using the test cases, such that whether the target is tested using a particular test case is governed by the dependencies among the test cases and success or failure of prior testing of the target using other of the test cases, resulting in, during testing the target, taking into account dependencies of the test cases to each other based on error-causing conditions of test failures and removing dependent test cases from the test queue irrespective of any bug fix being addressed.

12. The system of claim 11, wherein the first computer processor means is further configured for updating the dependency rules governing construction of the dependencies among the test cases, as the second computer processor means tests the target using the test cases.

13. The system of claim 11, wherein each test case comprises one or more of:
   a set of parameters by which the target is to be tested; and,
   a sequence of one or more actions to be performed in relation to the target for testing the target.

14. A computer program product for autonomic testing a target using a plurality of test cases, comprising:
   a computer readable storage medium having stored thereon a plurality of test cases embodied in computer readable program code that when executed by a processor, causes the processor to provide an automated testing tool by:
      constructing dependencies among the test cases using one or more dependency rules, source of dependencies being error-causing conditions of failures yielded during testing;
      testing a target using the test cases based on the dependency rules; and,
      updating the dependency rules governing construction of the dependencies among the test cases as the target is tested using the test cases such that (i) the testing tool takes into account dependencies of the test cases to each other in testing the target wherein a dependency between a first test case and a second test case means that where testing of the target using the first test case results in failure and yields a respective error-causing condition of the failure, then testing of the target using the second test case is not performed, the second test case being associated with the respective error-causing condition of the failure and being removed from a test queue irrespective of any bug fix being addressed, and (ii) the testing tool autonomically tests the target.

15. The computer program product of claim 14, wherein whether the target is tested using a particular test case is governed by the dependencies among the test cases and success or failure of prior testing of the target using other of the test cases.

16. The computer program product of claim 14 wherein testing the target using the test cases comprises:
   creating an order of the test cases in relation to which the target is to be tested, the order based on the dependencies among the test cases;
   testing the target using the test cases in the order created; and,
   updating the order of the test cases after the target has been tested using each test case and after the dependency rules have been updated.

17. The computer program product of claim 14, wherein updating the dependency rules governing construction of the dependencies among the test cases comprises:
   where testing the target using a given test case has resulted in failure and has yielded an error-causing condition,
      determining a dependency rule exists for the error-causing condition;
   where the dependency rule does not exist,
      creating the dependency rule for the error-causing condition;
   adding the test case to the dependency rule for the error-causing condition.

* * * * *